J. P. HEDSTROM.
FEED ADJUSTMENT FOR BAND SAW GRINDERS.
APPLICATION FILED JUNE 15, 1912.

1,082,633.

Patented Dec. 30, 1913.

WITNESSES:

John P. Hedstrom INVENTOR

BY

Geo. B. Willcox ATTORNEY

UNITED STATES PATENT OFFICE.

JOHN P. HEDSTROM, OF BIG RAPIDS, MICHIGAN.

FEED ADJUSTMENT FOR BAND-SAW GRINDERS.

1,082,633. Specification of Letters Patent. Patented Dec. 30, 1913.

Application filed June 15, 1912. Serial No. 703,989.

*To all whom it may concern:*

Be it known that I, JOHN P. HEDSTROM, a citizen of the United States, residing at Big Rapids, in the county of Mecosta and State of Michigan, have invented certain new and useful Improvements in Feed Adjustments for Band-Saw Grinders; and I do hereby declare the following to be a full, clear, and exact description of the invention, such as will enable others skilled in the art to which it appertains to make and use the same.

This invention is a feed adjustment for band saw grinders and relates more particularly to means for regulating the travel of the feed finger to enable teeth of various shapes to be ground, and to enable the change in the shape of the teeth to be effected without stopping the machine.

A further object of the present improvement is to enable the machine to be quickly adjusted to suit saws having teeth of different pitch.

My improvement may be adapted to various types of grinding machines, but is especially suited to that type of machine in which a reciprocating feed finger engages successive teeth on the saw to feed them forward intermittently, while a movable grinding wheel is brought into and removed from engagement with the teeth coincident with the action of the feed finger. In this type of machine the feed finger is preferably actuated by an oscillating bar, and heretofore the oscillating bar has generally been capable of adjustment in its travel so that it imparts various lengths of travel to the feed finger to suit different tooth pitches.

It is the purpose of my present improvement to provide means whereby this adjustment may be made quickly and accurately by a simple combination of mechanisms while the machine is in operation.

A further object of my invention is to provide means for easily and quickly compensating for wear of the rubbing surfaces.

My improvement also enables the following functions to be performed by simple adjustments of the machine while it is in operation, namely, to lengthen or shorten the travel of the feed finger, although in its forward travel it always stops at the same point; to change the shape of the saw tooth by varying the movement of the feed finger with relation to the movement of the grinding wheel; and to grind more or less of the metal from the back or convex portion of the tooth.

With these and certain other objects in view which will appear later in the specifications, my invention consists in the devices to be described and claimed, and the equivalents thereof.

Figure 1:
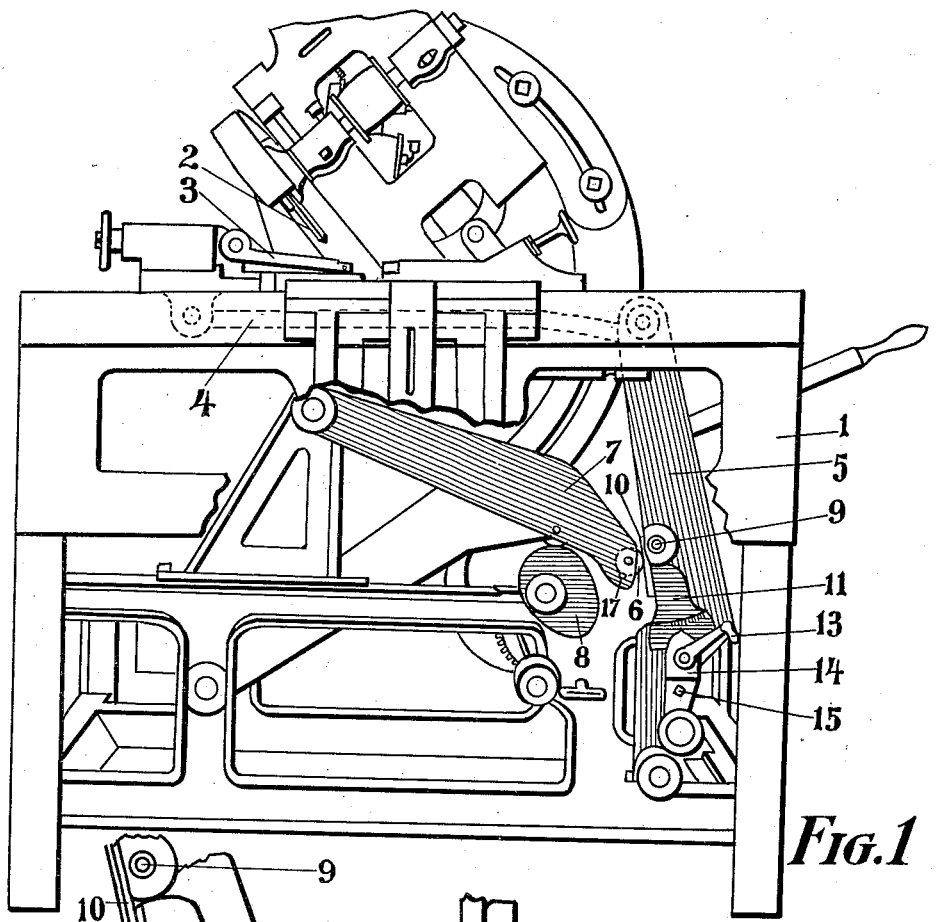
Figures 2, 3, 4:
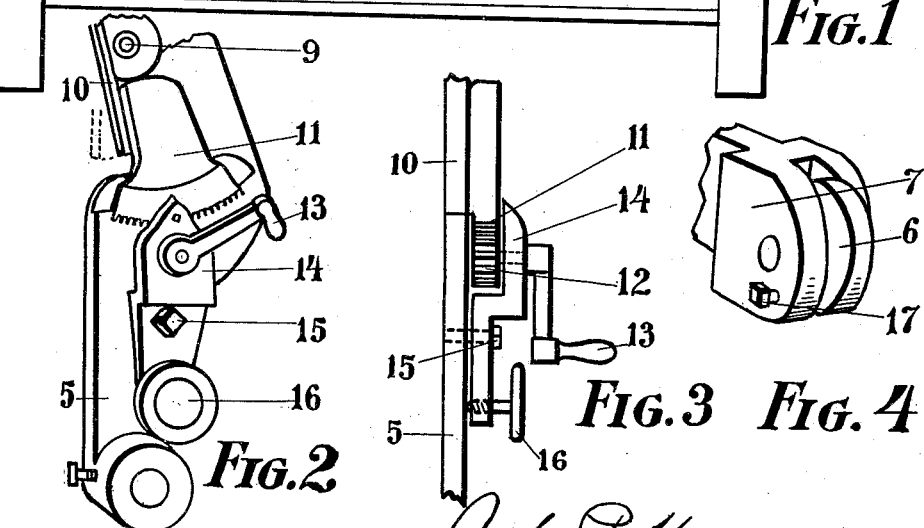

In the drawings, Figure 1 represents a front view broken away in part, of a saw-grinding machine with my improvement attached; Fig. 2 is a perspective detail of the adjusting mechanism; Fig. 3 is a side view of the same; and Fig. 4 is a detail of the wiper.

1 represents the frame of the machine upon which is carried the usual movable grinding wheel 2.

3 is the feed finger by which the saw is fed through the machine in the usual manner.

4 is a link connecting the feed finger carriage with the upper end of the oscillating arm 5. This arm is rocked back and forth by a wiper 6 mounted on the end of an oscillating bar 7. Bar 7 is pivoted at its rear end to the frame of the machine, and near its front end bears upon a revoluble cam 8, by which its free end and the wiper 6 carried thereby are moved up and down along the face of oscillating arm 5.

It will be observed that the wiper 6 will always travel to the same height on arm 5, this height being determined by the maximum radius of cam 8. At this point of highest travel of wiper 6 is pivoted upon arm 5 as at 9, a bearing plate 10. Formed integral with the bearing plate 10 or secured to it in any suitable manner is a toothed segment 11 disposed at the side of arm 5, as shown in Figs. 1 and 2. A pinion 12 meshes with the teeth of segment 11, the pinion being rotated by means of a handle 13. The pinion is held in place by a bracket 14 carried by arm 5, the bracket being loosely mounted by means of a bolt 15. At the lower end of bracket 14 is a screw wheel 16, the end of which bears against arm 5. When screw 16 is tightened, the upper end of bracket 14 is forced inwardly to clamp segment 11 tightly against the side of oscillating arm 5. By this means bearing plate 10 may be clamped in various angular positions with reference to the edge of arm 5, thereby varying the oscillation of the upper end of the arm and consequently the travel of feed finger 3, although it will be observed that since wiper 6 travels only as high as the pivotal point 9 of the bearing plate, the forward oscillation of the arm and consequently the forward travel of feed finger 3 stops always at the same point, the angular adjustment of plate 10 affecting only the rearward oscillation of the arm and the retracting of the feed finger. By loosening screw wheel 16 and turning handle 13, any desired adjustment of travel of the feed finger may be easily and quickly attained, and when so adjusted, screw wheel 16 may be tightened to clamp segment 11 and the bearing plate in place.

In practice I prefer to make the wiper 6 in the form of a hardened roller pivotally mounted in the end of oscillating bar 7, and normally held against rotating by means of a set screw 17, as shown in Fig. 4. When the face of wiper 6 has become somewhat worn, a new face may be presented by turning it partly around and clamping it in its new position by means of set screw 17.

By the means above described I have produced a simple and inexpensive device for quickly changing the travel of the feed finger while the machine is in motion, the adjustment being effected by means within easy reach of the operator.

Having described my invention, what I claim and desire to secure by Letters Patent, is:—

1. In a saw grinding machine, the combination with a feed finger and an oscillating arm connected thereto, and an oscillating bar having its free end in proximity to said arm; of an angularly adjustable bearing plate pivotally mounted on said arm and engaged by said bar, the pivotal point of said plate located at approximately the upper limit of travel of said bar; a segment gear carried by said plate, a bracket carried by said arm, a pinion pivoted to said bracket and engaging said gear; and means for clamping said bracket to the face of said segmental gear.

2. In a saw grinding machine, the combination with a feed finger and an oscillating arm connected thereto, and an oscillating bar having its free end in proximity to said arm; of an angularly adjustable bearing plate pivotally mounted on said arm and engaged by said bar, the pivotal point of said plate located at approximately the upper limit of travel of said bar; a segmental gear carried by said plate, a bracket carried by said arm, a pinion pivoted to said bracket and engaging said gear; and means for clamping said bracket to the face of said segmental gear; and a hardened roller pivotally mounted in the end of said oscillating bar, and clamping means engaging said roller to hold it against rotation, for the purposes set forth.

In testimony whereof, I affix my signature in presence of two witnesses.

JOHN P. HEDSTROM.

Witnesses:
CHRISTINE A. BRAIDEL,
GEO. W. SMITH.

---

Copies of this patent may be obtained for five cents each, by addressing the "Commissioner of Patents, Washington, D. C."